United States Patent

Knowles et al.

[11] Patent Number: 5,845,546
[45] Date of Patent: Dec. 8, 1998

[54] MULTIPLE CHAMBER TWIN CLUTCH AXLE

[75] Inventors: Dean P. Knowles, Clinton Township, Mich.; Mark T. Joslin, Tokyo, Japan

[73] Assignee: Borg-Warner Automotive, Inc., Sterling Heights, Mich.

[21] Appl. No.: 835,086

[22] Filed: Apr. 4, 1997

[51] Int. Cl.[6] .................................................. B60K 17/16
[52] U.S. Cl. .............................................................. 74/650
[58] Field of Search ................................ 74/650, 606 R

[56] References Cited

U.S. PATENT DOCUMENTS

| | | | |
|---|---|---|---|
| 4,681,180 | 7/1987 | Oyama et al. | 74/650 |
| 4,718,303 | 1/1988 | Fogelberg | 74/710.5 |
| 4,829,849 | 5/1989 | Masuda et al. | 74/650 |
| 4,960,011 | 10/1990 | Asano | 74/650 |
| 4,989,476 | 2/1991 | Shimada et al. | 74/650 |
| 4,991,679 | 2/1991 | Fujii et al. | 180/233 |
| 5,119,900 | 6/1992 | Watanabe et al. | 180/245 |
| 5,279,384 | 1/1994 | Shibahata et al. | 180/248 |
| 5,341,893 | 8/1994 | Fukui et al. | 180/245 |
| 5,396,421 | 3/1995 | Niikura et al. | 364/424.1 |
| 5,398,792 | 3/1995 | Teraoka | 192/48.2 |
| 5,632,185 | 5/1997 | Gassmann | 74/650 |
| 5,690,002 | 11/1997 | Showalter | 74/650 |

FOREIGN PATENT DOCUMENTS

| | | |
|---|---|---|
| 0 413 436 A1 | 2/1991 | European Pat. Off. . |
| 0 423 568 A2 | 4/1991 | European Pat. Off. . |

*Primary Examiner*—Dirk Wright
*Attorney, Agent, or Firm*—Brinks, Hofer, Gilson & Lione; Greg Dziegielewski

[57] ABSTRACT

A twin clutch axle for a motor vehicle defines independent fluid filled chambers: a pair of spaced apart chambers each receiving a respective one of the clutches and a separate, intermediate chamber receiving a hypoid drive gear. Each of the clutches is preferably an electromagnetically operated multiple friction plate assembly and the fluid in the clutch chambers is like or similar to automatic transmission fluid. The separate hypoid drive gear chamber is filled with a gear lubricant or heavy weight oil. The pair of clutch chambers may be sealed and fully independent of one another or may be in fluid communication with one another through, for example, passageways or a common sump. By utilizing separate compartments for the clutches and hypoid drive gear, the lubricants utilized therein can be optimized for friction clutch and gear operation thereby improving the performance and service life of the axle.

16 Claims, 3 Drawing Sheets

5,845,546

MULTIPLE CHAMBER TWIN CLUTCH AXLE

BACKGROUND OF THE INVENTION

The invention relates generally to twin clutch axles for motor vehicles and more specifically to twin clutch axles having each clutch disposed in a chamber filled with a clutch compatible fluid and an isolated chamber for the drive gears filled with a gear compatible lubricant.

Vehicle drive line and control systems having both electric and hydraulic modulating clutches have found broad application in adaptive vehicle drive systems. Such systems generally monitor the speeds of the front and rear drive shaft or compute such speeds by taking averages of individual readings of the two front and two rear wheels and, upon determining a speed difference between the drive shaft speeds or average speeds of the wheels, energize the modulating clutch according to a predetermined program to drive the speed difference and thus wheel slip toward zero. Such systems may also monitor and adjust modulating clutch activity in response to throttle position, steering angle and other variables.

Typically, such modulating clutches are physically disposed in a transfer case, adjacent and driven by the output of the vehicle transmission and operably disposed between the primary and secondary drive lines. Such systems are disposed in co-owned U.S. Pat. Nos. 5,407,024 granted Apr. 18, 1995 and 5,485,894 granted Jan. 23, 1996.

An alternate approach to vehicle skid control comprehends association of an individually operable clutch with each axle of a secondary, that is, part-time drive line. Selective, modulating activation of one or both of the clutches directs drive torque to one or both secondary drive wheels to adjust or correct vehicle yaw. An early system utilizing hydraulic clutches is disclosed in U.S. Pat. No. 4,681,180. Here, a control unit having steering angle, vehicle speed and engine torque inputs adjusts torque distribution between only the two rear wheels.

U.S. Pat. Nos. 5,195,901 and 5,119,900 both teach vehicles having two independently operable rear axle clutches in a drive line which provides primary drive torque to the front wheels and selectively provides drive torque to the rear wheels.

In U.S. Pat. No. 5,353,889, a rear axle includes a pair of hydraulically operated independent clutches controlled by associated hydraulic pressure clutches and pumps.

In U.S. Pat. No. 5,383,378, a twin clutch axle disposed at the front of a vehicle provides drive torque to the front (secondary) drive wheel in response to steering angle. U.S. Pat. No. 5,540,119 teaches a differential drive assembly for transferring rotational power without the use of conventional differential gearing. The device utilizes pairs of clutches and cam mechanisms which actuate said clutches in response a predetermined relative rotation.

While many problems have been addressed and new operational schemes achieved by the devices found in the prior art, it is apparent that certain problems have not been addressed. For example, in many of the hydraulically operated dual clutch differentials, the same hydraulic fluid utilized to operate the clutch functions as the lubricant for the gear set. In fact, the requirements and characteristics of clutch fluid are distinct from and, in many instances, contrary to those characteristics of a gear lubricant. Accordingly, the operation of the rear axle differential may be compromised. The present invention addresses such matters.

SUMMARY OF THE INVENTION

A twin clutch axle for a motor vehicle defines independent fluid filled chambers: a pair of spaced apart chambers each receiving a respective one of the clutches and a separate, intermediate chamber receiving a hypoid drive gear. Each of the clutches is preferably an electromagnetically operated multiple friction plate assembly and the fluid in the clutch chambers is like or similar to automatic transmission fluid. The separate hypoid drive gear chamber is filled with a gear lubricant or heavy weight oil.

The pair of clutch chambers may be sealed and fully independent of one another or may be in fluid communication with one another through, for example, passageways or a common sump. By utilizing separate compartments for the clutches and hypoid drive gear, the lubricants utilized therein can be optimized for friction clutch and gear operation thereby improving the performance and service life of the axle.

It is thus the object of the present invention to provide a motor vehicle axle having twin clutches and a gear set disposed in independent chambers.

It is a further object of the present invention to provide a motor vehicle axle having independently operable clutches and a hypoid gear set disposed in separate, sealed, fluid filled chambers.

It is a still further object of the present invention to provide a twin clutch rear axle wherein the clutches and the hypoid gear set are disposed in distinct fluids ideally suited to provide optimum operation and service life.

It is a still further object of the present invention to provide a twin axle clutch which exhibits exceptional torque throughput and quiet operation.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
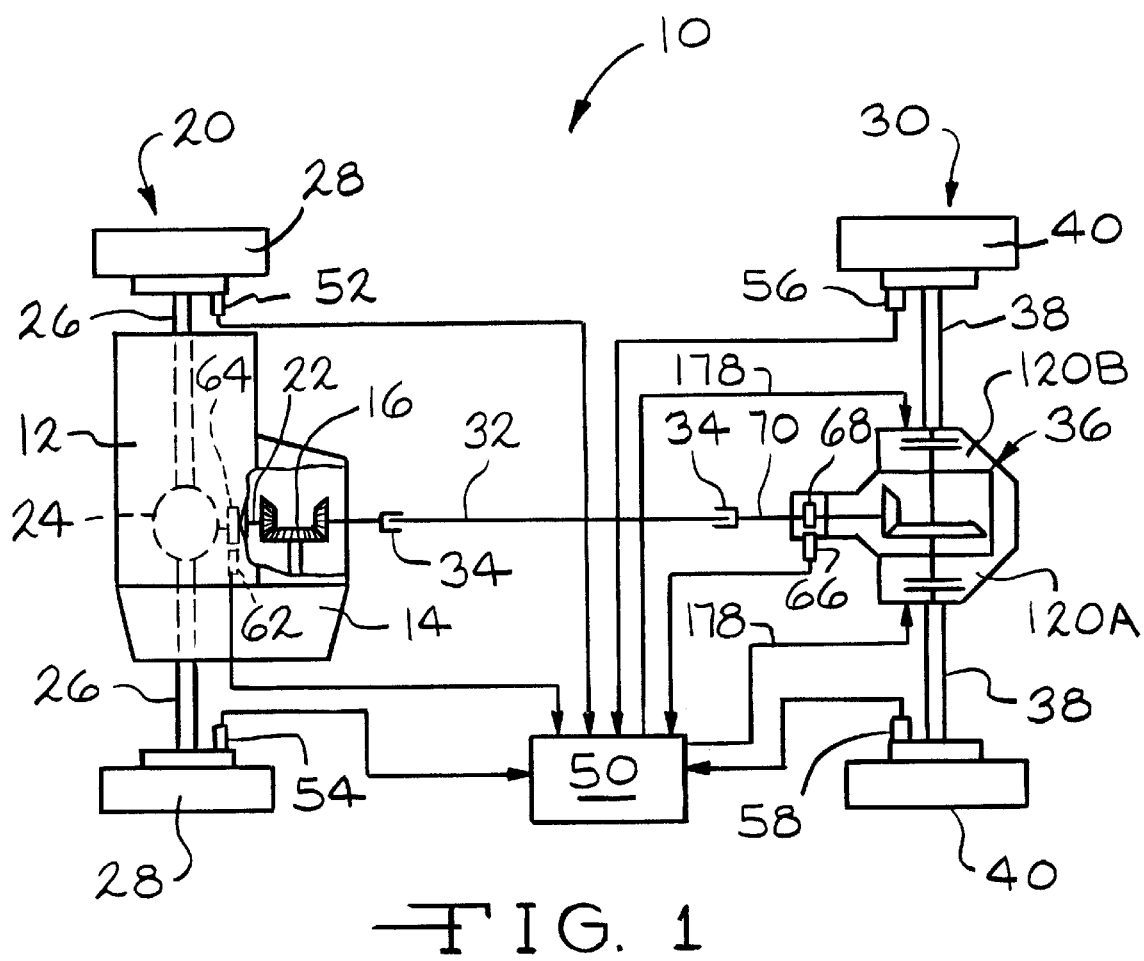
FIG. 1 is a diagrammatic view of a vehicle drive system for a four-wheel vehicle incorporating the twin clutch axle of the present invention.

Referring now to. FIG. 1, an adaptive four-wheel vehicle drive train is diagrammatically illustrated and designated by the reference numeral 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front drive line 20 comprising a front or primary propshaft 22, a front or primary differential 24, a pair of live front axles 26 and a respective pair of front or primary tire and wheel assemblies 28. It should be appreciated that the front or primary differential 24 is conventional.

The beveled or spiral beveled gear set 16 also provides motive power to a secondary or rear drive line 30 comprising a secondary propshaft 32 having appropriate universal joints 34, a rear or secondary differential assembly 36, a pair of live secondary or rear axles 38 and a respective pair of secondary or rear tire and wheel assemblies 40. As utilized herein with regard to the secondary differential assembly 36, the terms "differential" and "axle" are used inter-changeably to identify a device for receiving drive line torque, distributing it to two transversely disposed wheels and accommodating rotational speed differences resulting from, inter alia, vehicle cornering. As such, the terms are intended to include devices such as the present invention which provide these functions but which do not include a conventional epicyclic gear train.

The foregoing description relates to a vehicle wherein the primary drive line 20 is disposed at the front of the vehicle and, correspondingly, the secondary drive line 30 is disposed at the rear of the vehicle, such a vehicle commonly being referred to as a front wheel drive vehicle. The designations "primary" and "secondary" utilized herein refer to drive lines providing drive torque at all times and drive lines providing supplemental or intermittent torque, respectively. These designations (primary and secondary) are utilized herein rather than front and rear inasmuch as the invention herein disclosed and claimed may be readily utilized with vehicles wherein the primary drive line 20 is disposed at the rear of the vehicle and the secondary drive line 30 and components within the secondary differential assembly 36 are disposed at the front of the vehicle.

Thus, the illustration in FIG. 1, wherein the primary drive line 20 is disposed at the front of the vehicle should be understood to be illustrative rather than limiting and that the components and the general arrangement of components illustrated is equally suitable and usable with a primary rear wheel drive vehicle. In such a vehicle, the primary differential 24 would replace the secondary differential assembly 36 at the rear of the vehicle and the secondary differential assembly 36 would be moved to the front of the vehicle to replace the primary differential 24.

Associated with the vehicle drive train 10 is a microprocessor 50 which receives signals from a plurality of sensors and provides two control, i.e., actuation signals to the secondary differential assembly 36. Specifically, a first sensor such as a variable reluctance or Hall effect sensor 52 senses the rotational speed of the left primary (front) tire and wheel assembly 28 and provides an appropriate signal to the microprocessor 50. Similarly, a second variable reluctance or Hall effect sensor 54 senses the rotational speed of the left primary (front) tire and wheel assembly 28 and provides a signal to the microprocessor 50. A third variable reluctance or Hall effect sensor 56 senses the rotational speed of the right secondary (rear) tire and wheel assembly 40 and provides a signal to the microprocessor 50. Finally, a fourth variable reluctance or Hall effect sensor associated with the left secondary (rear) tire and wheel assembly 40 senses its speed and provides a signal to the microprocessor 50. It should be understood that the speed sensors 52, 54, 56 and 58 may be independent, i.e., dedicated, sensors or may be those sensors mounted in the vehicle for anti-lock brake systems (ABS) or other speed sensing and control equipment. It is also to be understood that an appropriate and conventional counting or tone wheel is associated with each of the speed sensors 52, 54, 56 and 58 although they are not illustrated in FIG. 1.

In order to provide optimum skid or yaw control, the microprocessor 50 also requires information regarding the output speed of the transaxle 14. Accordingly, a variable reluctance or Hall effect sensor 62 which is associated with a tone wheel 64 on the front or primary prop shaft 22 may be utilized. In the alternative, a variable reluctance or Hall effect sensor 66 associated with the secondary differential assembly 36 and positioned adjacent a tone wheel 68 on an input shaft 70 of the secondary differential assembly 36 may also be utilized. The microprocessor 50 includes software which receives and conditions the signals from the sensors 52, 54, 56 and 58 as well as either the sensor 62 or the sensor 66, determines corrective action to improve the stability of the vehicle, maintain control of the vehicle and/or correct and compensate for a skid or other anomalous yaw condition of the vehicle and provides two independent output signals to the secondary differential assembly 36.

Figure 2:
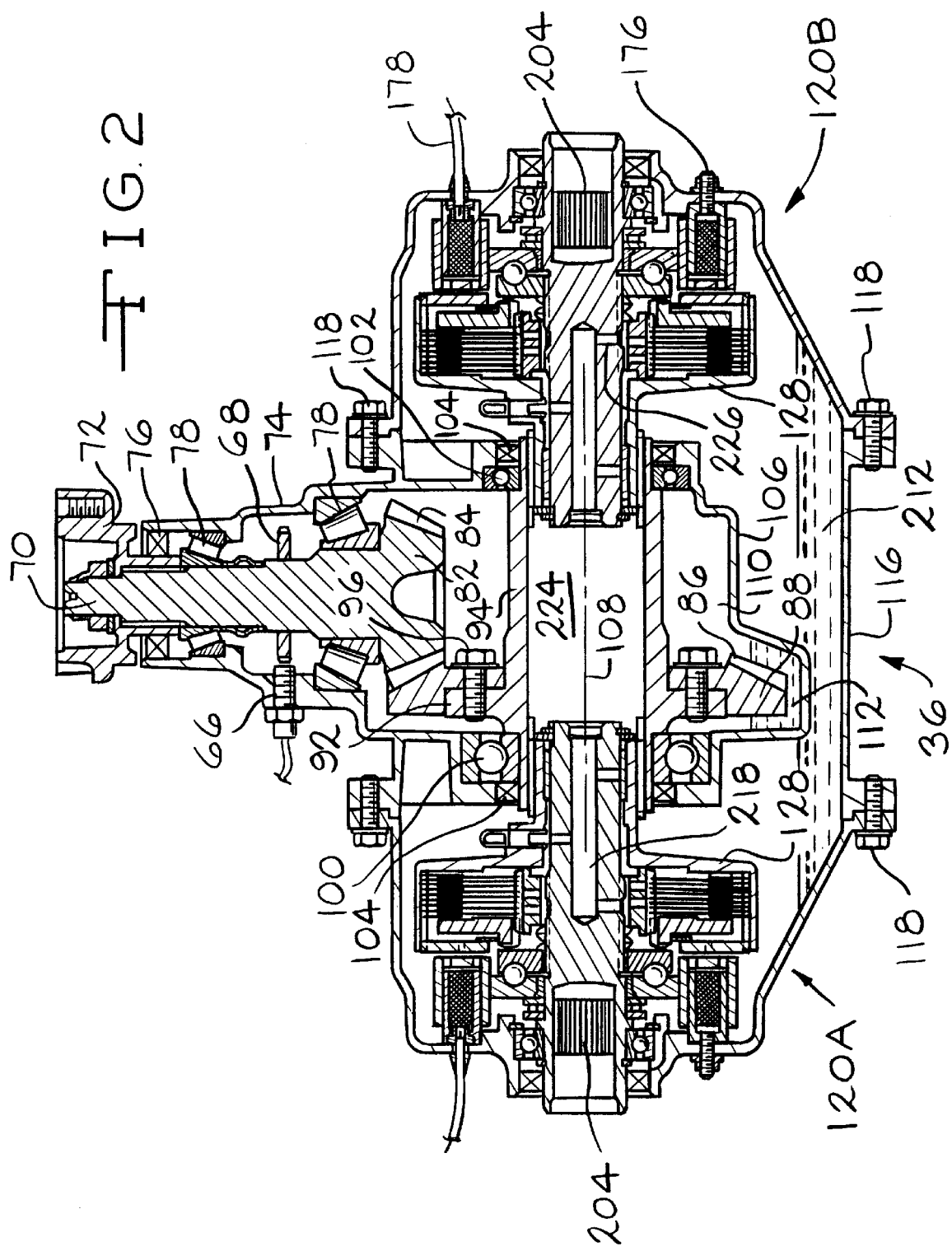
FIG. 2 is a full, sectional view of a twin clutch axle according to the present invention and, FIG. 3 is an enlarged, sectional view of a portion of a multiple chamber twin clutch axle according to the present invention.

Referring now to FIG. 2, the input shaft 70 of the secondary differential assembly 36 may include a flange 72 or similar component which forms a portion of a connection such as a universal joint 34 to the secondary propshaft 32. The input shaft 70 is received within a centrally disposed housing 74 and is surrounded by a suitable oil seal 76 which provides a fluid impervious seal between the housing 74 and the input shaft 70 or an associated portion of the flange 72. The input shaft 70 is preferably rotatably supported by a pair of anti-friction bearings such as the tapered roller bearing assemblies 78. The input shaft 70 terminates in a hypoid or beveled gear 82 having gear teeth 84 which mate with complementarily configured gear teeth 86 on a ring gear 88 secured to a flange 92 on a centrally disposed tubular drive member 94 by suitable fasteners 96. The tubular drive member 94 is rotatably supported by a pair of anti-friction bearings such as a larger ball bearing assembly 100 on the end of the tubular drive member 94 adjacent the ring gear 88 and a smaller ball bearing assembly 102 on the opposite end. The ball bearing assembly 100 is preferably larger than the ball bearing assembly 102 due to the significantly greater forces carried and dispersed by the end of the tubular drive member 94 proximate the ring gear 88 and associated drive components. Disposed adjacent each of the ball bearing assemblies 100 and 102 on their outboard edges, that is, away from the center, are circular oil seals 104.

A contoured, semi-circular lower housing 106 preferably extends circumferentially 180° and mates with the center housing 74 along a parting line defined by the reference center line 108. The housings 74 and 106 and the oil seals 76 and 104 create a sealed interior 110 which contains a suitable weight oil or gear lubricant 112 which properly lubricates the bearings and particularly the engaging teeth 84 and 86 of the gears 82 and 88, respectively. The oil or gear lubricant 112 is preferably SAE 80 or 90 weight oil but may be much lighter such as SAE 30 or 40 weight depending upon the type of gears, ambient and operating temperatures and other operating considerations.

Figure 3:
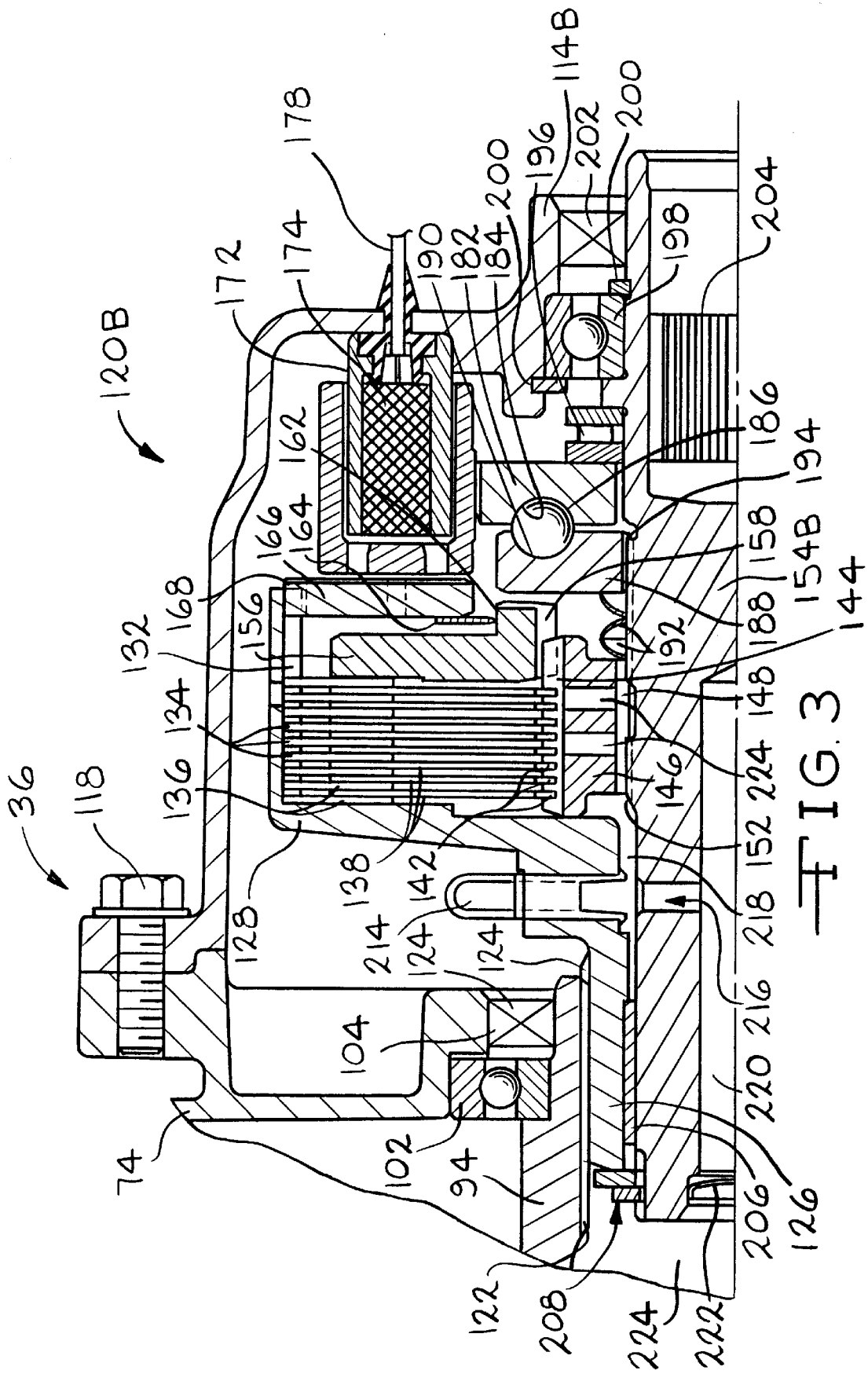

Turning now to FIGS. 2 and 3, the secondary differential assembly 36 includes a pair of bell housings 114A and 114B which are attached to the center housing 74 and an intermediate plate 116 by threaded fasteners 118. The intermediate plate 116 may be a portion of the center housing 74. The housings 114A and 114B are mirror-image, i. e., left and right, components which each receive a respective one of a pair of modulating clutch assemblies 120A and 120B. But for the opposed, mirror-image arrangement of the two modulating clutch assemblies 120A and 120B, the components of the two clutch assemblies 120A and 120B described below are identical and thus only the modulating clutch assembly 120B disposed on the right of FIG. 2 and in FIG. 3 will be fully described, it being understood that the left modulating clutch assembly 120A is in all significant respects identical to the right modulating clutch assembly 120B.

Each of the modulating clutch assemblies 120A and 120B is driven by the tubular drive member 94 which includes two sets of internal splines or gear teeth 122 which engage complementarily configured male splines or gear teeth 124 on a tubular sleeve or extension 126 of a clutch end bell 128. The clutch end bells 128 are identical but disposed in a mirror-image relationship on opposite ends of the tubular drive member 94. The interior, circumferential surface of the end bell 128 defines a plurality of axially extending female splines 132 which are engaged by and rotationally drive complementary male splines 134 disposed on a first plurality of clutch discs or plates 136. The first plurality of clutch discs or plates 136 include suitable frictional material and surfaces and are interleaved with a second, plurality of smaller diameter clutch discs or plates 138 also including suitable frictional material and surfaces and have female splines 142 which engage and rotationally drive complementary male splines 144 disposed upon an annulus or collar 146. The collar 146, in turn, includes female splines or internal gear teeth 148 which mate with complementarily configured male splines or external gear teeth 152 disposed on an output shaft 154B.

The modulating clutch assembly 120B also includes a circular apply plate 156 which includes female splines or internal gear teeth 158 which mate with the male splines 144 on the collar 146. The apply plate 156 thus rotates with the second plurality of clutch plates 138 and may move axially relative thereto. The apply plate 156 includes a shoulder 162 which positions and receives a flat washer 164. The flat washer 164 provides a thrust bearing between the apply plate 156 and an armature 166. The armature 166 include male splines 168 about its periphery which are complementary to and engage the female splines 132 on the interior of the end bell 128. Thus, the armature 166 rotates with the end bell 128 and the first plurality of clutch plates 136. The armature 166 is disposed adjacent a U-shaped circular rotor 171. The rotor 171 generally surrounds a stationary housing 172 which contains an electromagnetic coil 174. The stationary housing 172 and coil 174 are secured to the bell housing 114B by a plurality of threaded studs and fasteners 176, one of which is illustrated in FIG. 2. Electrical energy may be provided to the electromagnetic coil 174 through a conductor 178.

Coupled to the rotor 168 by any suitable means such as weldments, interengaging splines or an interference fit is a first circular member 182. The first circular member 182 defines a loose, freely rotating fit about the output shaft 154B and thus the first circular member 182 and the rotor 168 are free to rotate about both the output shaft 154B and the housing 172 of the electromagnetic coil 174. The first circular member 182 includes a plurality of curved ramps or recesses 184 arranged in a circular pattern about the axis of the output shaft 154B. The ramps or recesses 184 represent oblique sections of a helical torus. Disposed within each of the recesses 184 is a load transferring ball 186 or similar load transferring member which rolls along the ramps defined by the oblique surfaces of the recesses 184. A second circular member 188 is disposed in opposed relationship with the first circular member 182 and includes a like plurality of complementarily sized and arranged recesses 190. The load transferring balls 186 are thus received and trapped within the pairs of opposing recesses 184 and 190, the ends of the recesses being curved and much steeper in slope than the interior regions of the recesses 184 and 190 such that the load transferring balls 186 are effectively trapped therein. A plurality of wave washers or Belleville springs 192 are disposed between the second circular member 188 and the collar 146 and bias the second circular member 188 toward the first circular member 182.

It will be appreciated that the recesses 184 and 190 and the load transferring balls 186 may be replaced with other analogous mechanical elements which cause axial displacement of the circular members 182 and 188 in response to relative rotation therebetween. For example, tapered rollers disposed in complementarily configured conical helices may be utilized.

An important design consideration of the recesses 184 and 190, the load transferring balls 186 and the springs 192 is that the geometry of their design and the clearances in the clutch assembly overall ensure that the clutch assemblies 120A and 120B are not self-locking. The modulating clutch assemblies 120A and 120B must not self-engage but rather must be capable of modulating clamping of the clutch plates 136 and 138 and torque transfer in direct, proportional response to the input to the electromagnetic coil 174. Additional details of this mechanism may be found in U.S. Pat. No. 5,492,194 which is hereby incorporated by reference.

The second circular member 188 includes a plurality of female splines or gear teeth 194 which are complementary to and engage the male splines or external gear teeth 152 on the output shaft 154B. The axial position of the first circular member 182 is established by a thrust bearing assembly 196. Adjacent the thrust bearing assembly 196 is an anti-friction bearing such as a ball bearing assembly 198 which rotatably supports, and axially locates the output shaft 154B. The ball bearing assembly 198 is retained by a pair of snap rings 200 and axial positions the output shaft 154B relative to the bell housing 114B. Adjacent the ball bearing assembly 198 and the terminus of the output shaft 154B is an oil seal 202. The terminal portion of the output shaft 154B defines an internal set of gear teeth or female splines 204 which receive and engage a complementarily configured set of male splines as external gear teeth (not illustrated) on the rear axle 38. The opposite end of the output shaft 154B is rotatably supported in a cylindrical journal bearing or bushing 206 received within the tubular extension 126 of the end bell 128. The end bell 128 is retained on the output shaft by a snap ring and washer combination 208.

In order to provide appropriate cooling for the components of the secondary differential assembly 36 and specifically of the modulating clutch assemblies 120A and 120B, the interior portions of the bell housings 114A and 114B and the intermediate plate 116 form a sump 210 within which a lubricating and cooling fluid 212 such as automatic transmission fluid (ATF) or lubricant having similar characteristics is disposed. A scavenger or scoop 214 having a mouth open toward the direction of rotation of the output shaft 154B when the vehicle is moving forward extends radially therefrom. As the output shaft 154B rotates, the scoop 214 collect and drive lubricating and cooling fluid 212 radially inwardly through radial passageways 216 to an axially extending annular passageway 218 and coaxial passageway 220 disposed in the output shaft 154B. The coaxial passageway 220 is closed at its end within the tubular drive member 94 by an end cap or plug 222. The lubricating and cooling fluid 212 moving through the annular passageway 218 flows through radial passageways 224 in the collar 146 and into the modulating clutch assembly 120B. The fluid 212 also flows through the coaxial passageway 220 in the output shaft 154B and thence through the radial passageway 226 (illustrated in FIG. 2) to the clutch assembly 120B. The heat generated in the modulating clutch assemblies 120A and 120B during operation is thus transferred to the circulating lubricating and cooling fluid 212 and dispersed throughout the secondary differential assembly 36. There will typically be an exchange, i.e., lateral transfer, of fluid the 212 between the modulating clutch assemblies 120A and 120B through the sump 210 which further facilitates heat dispersion.

It will thus be appreciated that a differential assembly 36 according to the present invention which defines a pair of chambers, includes a common sump 210 and receives a pair of modulating clutch assemblies 120A and 120B are provided with a fluid such as lubricating and cooling fluid 212 such as automatic transmission fluid (ATF) or fluid having similar specific performance characteristics which provides optimum lubricating, friction coupling and heat transfer characteristics for the clutch assemblies 120A and 120B and which further includes a sealed chamber defined by the center housing 74 and the lower housing 106 which receives preferably SAE 80 to 90 weight oil or for certain applications lighter oil which provides optimum lubrication for the gears 82 and 88. The differential assembly 36 according to the present invention thus provides excellent torque throughput and service life performance of the clutch assemblies 120A and 120B and excellent service life and low noise performance of the gears 82 and 84.

Although the foregoing description of the preferred embodiment relates to a differential assembly 36 having twin clutch assemblies 120A and 120B with electromagnetic operators having electromagnetic coils 174, it should be understood that this embodiment and description are illustrative and exemplary only. Accordingly, modulating clutch assemblies 120A and 120B having hydraulic or pneumatic operators, i.e., piston and cylinder assemblies, with associated variable pressure fluid supplies are deemed to be within the scope of this invention.

The foregoing disclosure is the best mode devised by the inventors for practicing this invention. It is apparent, however, that apparatus incorporating modifications and variations will be obvious to one skilled in the art of gear and clutch drive line components. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A motor vehicle drive line differential comprising, in combination,
   an input member,
   a gear set driven by said input member and having a tubular output member,
   a pair of clutches each having an end bell operably coupled to said tubular output member, first and second pluralities of interleaved clutch plates, said first plurality of clutch plates coupled to said end bell and said second plurality of clutch plates coupled to an output adapted to drive an axle and a ball ramp electromagnetic operator disposed adjacent said interleaved plurality of clutch plates, and
   a housing having a first chamber for receiving said gear set and a gear lubricant and a second chamber for receiving said pair of clutches and clutch fluid.

2. The drive line differential of claim 1 wherein said second chamber includes a sump for receiving said clutch fluid.

3. The drive line differential of claim 1 wherein said clutch outputs include a shaft member having internal splines or gear teeth.

4. The drive line differential of claim 1 wherein said gear set is a hypoid gear set.

5. The drive line differential of claim 1 wherein said output of said gear set defines an elongate member and said elongate member and said input member are rotatably disposed within said first chamber of said housing.

6. A twin clutch axle comprising, in combination,
   an input member,
   a right angle gear set driven by said input member and having a first output member having end adjacent first splines,
   a pair of clutches, each of said clutches having an input end bell having second splines engaging said first splines and driven by said first output member, a second output member disposed for rotation within said output member, a multiple plate clutch pack operatively disposed between said input end bell and said second output member and a clutch actuator having an electromagnetic coil disposed adjacent said clutch pack, and
   a housing having a first chamber for receiving said gear set and a region separate from said first chamber for receiving said pair of clutches.

7. The twin clutch axle of claim 6 further including gear lubricant disposed in said first chamber.

8. The twin clutch axle of claim 6 further including clutch compatible fluid disposed in said region.

9. The twin clutch axle of claim 6 further including at least one scavenger and communicating fluid passageways associated with each of said clutches for providing a flow of clutch cooling and lubricating fluid.

10. The twin clutch axle of claim 6 wherein said input member is a shaft and said first output member is tubular and further including a plurality of anti-friction bearings rotatably supporting said shaft and said first output member.

11. The twin clutch axle of claim 6 further including a first speed sensor and tone wheel disposed on said input member.

12. The twin clutch axle of claim 6 wherein each of said second output members includes splines adapted to receive complementarily configured splines on an axle.

13. A twin clutch axle assembly for a motor vehicle comprising, in combination,
    an input shaft,
    a gear set driven by said input shaft and having an output member,
    a pair of clutches coupled to said output member of said gear set, each of said pair of clutches including an end bell operably coupled to said output member of said gear set, first and second pluralities of interleaved clutch plates, said first plurality of clutch plates coupled to said end bell and said second plurality of clutch plates coupled to an output adapted to drive an axle and an electromagnetic ball ramp operator disposed adjacent said interleaved plurality of clutch plates, and
    a housing having regions at least partially filled with clutch compatible fluid for receiving a respective one of said pair of clutches and a separate chamber at least partially filled with gear lubricant for receiving said gear set.

14. A twin clutch axle assembly of claim 13 further including a sump which provides fluid communication between said pair of regions.

15. A twin clutch axle assembly of claim 13 wherein said pair of outputs of said pair of clutches include female splines adapted to receive complementarily configured splines on an axle.

16. A twin clutch axle assembly of claim 13 further including at least one scavenger and communicating fluid passageways associated with each of said clutches for providing a flow of clutch cooling and lubricating fluid.

* * * * *